United States Patent
Denny

(10) Patent No.: US 6,701,789 B1
(45) Date of Patent: Mar. 9, 2004

(54) COLD CATHODE VACUUM GAUGING SYSTEM

(75) Inventor: Edward C. Denny, Knoxville, TN (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 05/633,324

(22) Filed: Nov. 18, 1975

(51) Int. Cl.$^7$ ................................................. G01L 7/00
(52) U.S. Cl. ....................................................... 73/700
(58) Field of Search ....................... 233/DIG. 1; 73/700

(56) References Cited

U.S. PATENT DOCUMENTS 2,733,857 A * 2/1956 Beams .................... 324/175 X

* cited by examiner

*Primary Examiner*—Michael J. Carone
*Assistant Examiner*—R Palabrica
(74) *Attorney, Agent, or Firm*—Emily G. Schneider; Paul A. Gottlieb

(57) ABSTRACT

A vacuum gauging system of the cold cathode type is provided for measuring the pressure of a plurality of separate vacuum systems, such as in a gas centrifuge cascade. Each casing is fitted with a gauge tube assembly which communicates with the vacuum system in the centrifuge casing. Each gauge tube contains an anode which may be in the form of a slender rod or wire hoop and a cathode which may be formed by the wall of the gauge tube. The tube is provided with an insulated high voltage connector to the anode which has a terminal for external connection outside the vacuum casing. The tube extends from the casing so that a portable magnet assembly may be inserted about the tube to provide a magnetic field in the area between the anode and cathode necessary for pressure measurements in a cold cathode-type vacuum gauge arrangement. The portable magnetic assembly is provided with a connector which engages the external high voltage terminal for providing power to the anode within in the gauge tube. Measurement is made in the same manner as the prior cold cathode gauges in that the current through the anode to the cathode is measured as an indication of the pressure. By providing the portable magnetic assembly, a considerable savings in cost, installation, and maintenance of vacuum gauges for pressure measurement in a gas centrifuge cascade is realizable.

5 Claims, 2 Drawing Sheets

COLD CATHODE VACUUM GAUGING SYSTEM

BACKGROUND OF THE INVENTION

This invention relates generally to cold cathode-type vacuum gauges, and more specifically relates to a vacuum gauging system especially suited for large-scale use in a facility having a plurality of separate vacuum system which do not require continuous pressure monitoring.

This invention was made during the course of, or under, a contract with the Energy Research and Development Administration.

A cold cathode vacuum gauge, sometimes called a Penning or Philips gauge, is used to measure vacuum pressures by measuring the current due to positive ions produced by electrons with gas molecules between a cathode and an anode electrode in the vacuum medium being measured. A magnetic field is applied between the cathode and anode to increase the electron path length between the two electrodes so that the probability of collision of the electrons with the sparse population of gas molecules is increased to produce positive ions. A high voltage, usually between 2 and 4 KV, is applied between the electrodes. An ammeter calibrated in pressure units reads the current between the cathode and anode as a measure of the pressure.

In a large gas centrifuge plant, many thousands of individual centrifuges are to be operated continuously. Plans now call for installing a vacuum gauge preferably of the cold cathode type in the vacuum casing of each centrifuge where it will be used for several purposes. For example, the vacuum gauge is needed to monitor the casing pressure (region of $10^{-5}$ to $10^{-3}$ torr) during startup of the centrifuge. If the pressure is not as low as it should be, the centrifuge will not accelerate properly, and as a consequence costly downtime will be increased.

Another reason for maintaining vacuum gauging capabilities in each centrifuge casing is in the diagnostic measurement of an over-pressure condition in an operating centrifuge. In this case, some other diagnostic means, perhaps a deceleration circuit, may be used to indicate a centrifuge is failing because of loss of rotor speed. If the cause is from some means other than pressure, immediate action may not be necessary. But if the casing pressure is building up, immediate action must be taken. A pressure measurement made at such time reveals that the loss in speed is due to rising pressure, verifying the need for isolation and deceleration of the rotor of the centrifuge.

In this and other diagnostic applications, the vacuum gauge is not operated continuously. In fact, it is to be turned "on" only during these infrequent pressure measurements. The reason for such a mode of operation is that the $UF_6$ environment in the centrifuge and the high voltage on the cathode unit of the gauge itself tends to degrade the instrument over a period of time. In a large centrifuge plant then a vacuum gauge is required in the startup of every centrifuge, and a capability to make a pressure reading on any centrifuge at any time thereafter must be maintained. In the quantities needed, however, the price of an individual cold cathode vacuum gauge for each vacuum casing in a gas centrifuge cascade is quite expensive. Thus, there is a need for a vacuum gauging system which will meet the objectives and requirements of a gas centrifuge cascade and yet minimize the costs for adequate pressure monitoring.,

SUMMARY OF THE INVENTION

In view of the above need, it is an object of this invention to provide a vacuum gauging system of the cold cathode type for selectively measuring the pressure of a plurality of separate vacuum systems which is considerably less expensive than providing a separate vacuum gauge for each vacuum system.

Another object of this invention is to provide a vacuum gauging system as set forth in the above object in which a gauge tube assembly including the anode and cathode electrode structure of the gauge is mounted with each vacuum system casing and a portable means is provided to be selectively connected to the gauge tube to apply a magnetic field in the area between the anode and cathode electrodes and provide a pressure readout indicated by the magnitude of current flow between the cathode and anode electrodes when a high voltage is applied therebetween.

Further, it is an object of this invention to provide a vacuum gauging system as set forth in the above objects which may be used with the vacuum casings of a gas centrifuge cascade.

Other objects and many of the attendant advantages of the present invention will be obvious from the following detailed description taken in conjunction with the drawings.

DETAILED DESCRIPTION

Figure 1:
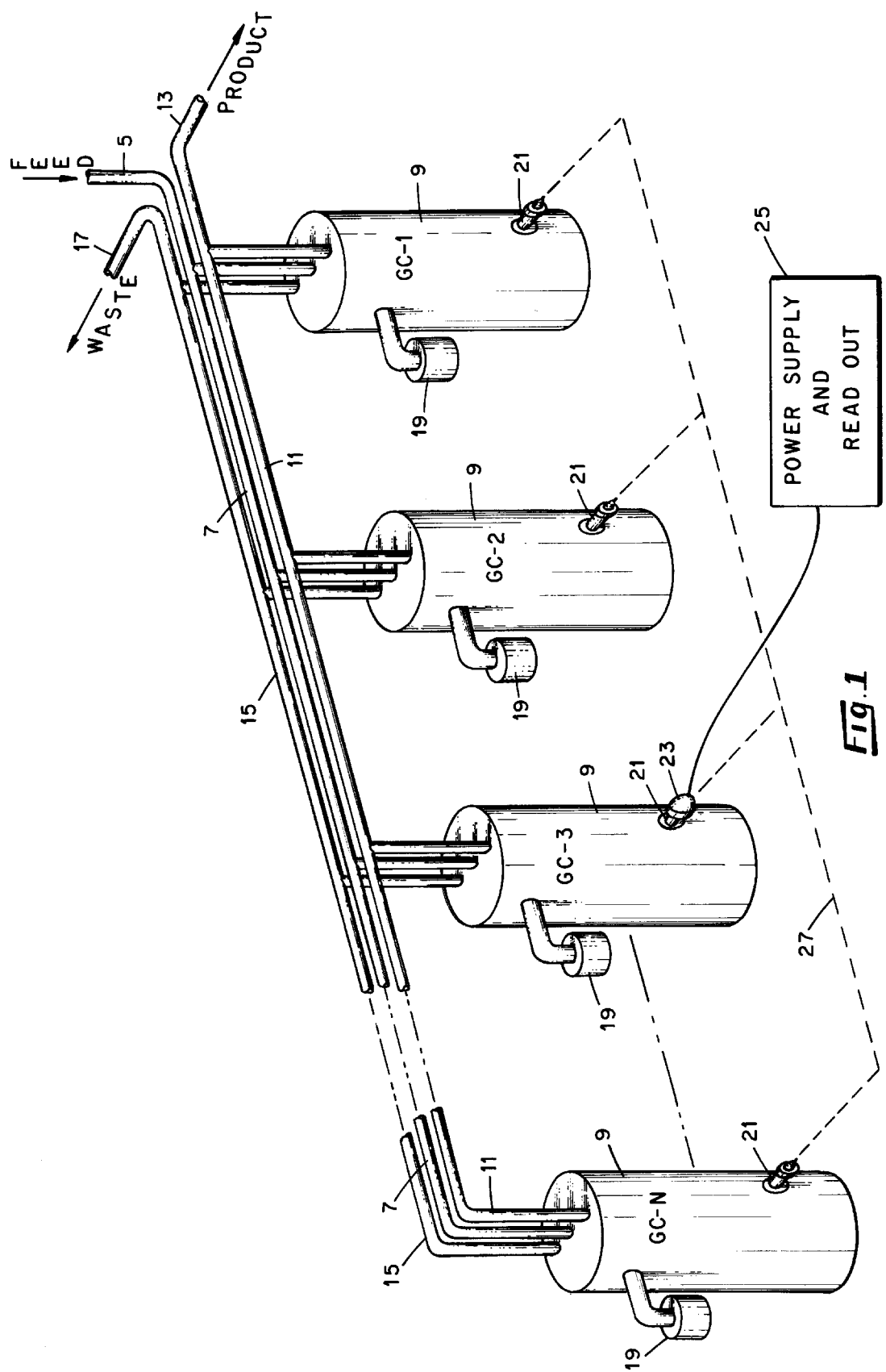
FIG. 1 is a schematic diagram of a typical N-stage gas centrifuge subcascade utilizing a vacuum gauging system according to the present invention.

Referring now to FIG. 1 there is schematically illustrated a typical bank, or subcascade, of gas centrifuge machines (GC-1 through GC-n) incorporating the vacuum gauging system of the present invention. A complete cascade comprises a multiplicity of such subcascades which operate together to obtain a desired separation factor of isotopes of $UF_6$ in the gaseous state.

As shown, the feed line 5 discharges into a feed header 7 for feed gas insertion into a number of gas centirfuge machines 9 arranged in parallel. The product which is a lighter isotope ($^{235}UF_6$) is taken from the machine into a product flow header 11 and advances to the next subcascade through product line 13. The waste gas which is the heavier isotope ($^{238}UF_6$) is taken from each machine through a waste header 15 and flows to a subsequent subcascade through waste line 17.

Although the present invention is applicable to other systems which have a considerable number of separate vacuum systems, it will be illustrated as applicable to a gas centrifuge cascade in which a large number of gas centrifuge machines are interconnected to form a gas centrifuge cascade. Therefore, the operation and makeup of the particular machine do not form a part of this invention; and, thus, need not be described in detail to obtain a thorough understanding of the present invention. It is, however, important to realize the expense involved in maintaining a separate vacuum gauge for each of the machines in a gas centrifuge cascade. This expense can be reduced considerably by use of the vacuum gauging system of this invention.

Referring still to FIG. 1, each gas centrifuge 9 is provided with a gas-tight outer vacuum casing which is connected to separate vacuum pumps 19. To illustrate the system of this invention, each centrifuge vacuum casing is provided with a gauge tube assembly 21 which remains fixed in each machine and communicates with the vacuum environment. within the casing 9 by means of a vacuum fitting as will be described hereinbelow. A portable means including a removable housing assembly 23 and a power supply and readout unit 25 may be moved throughout the gas centrifuge cascade facility to provide pressure readout on a selected one of the machines 9 by placing the removable assembly 23 on the selected gauge tube 21, as illustrated by the dashed lines 27.

Figure 2:
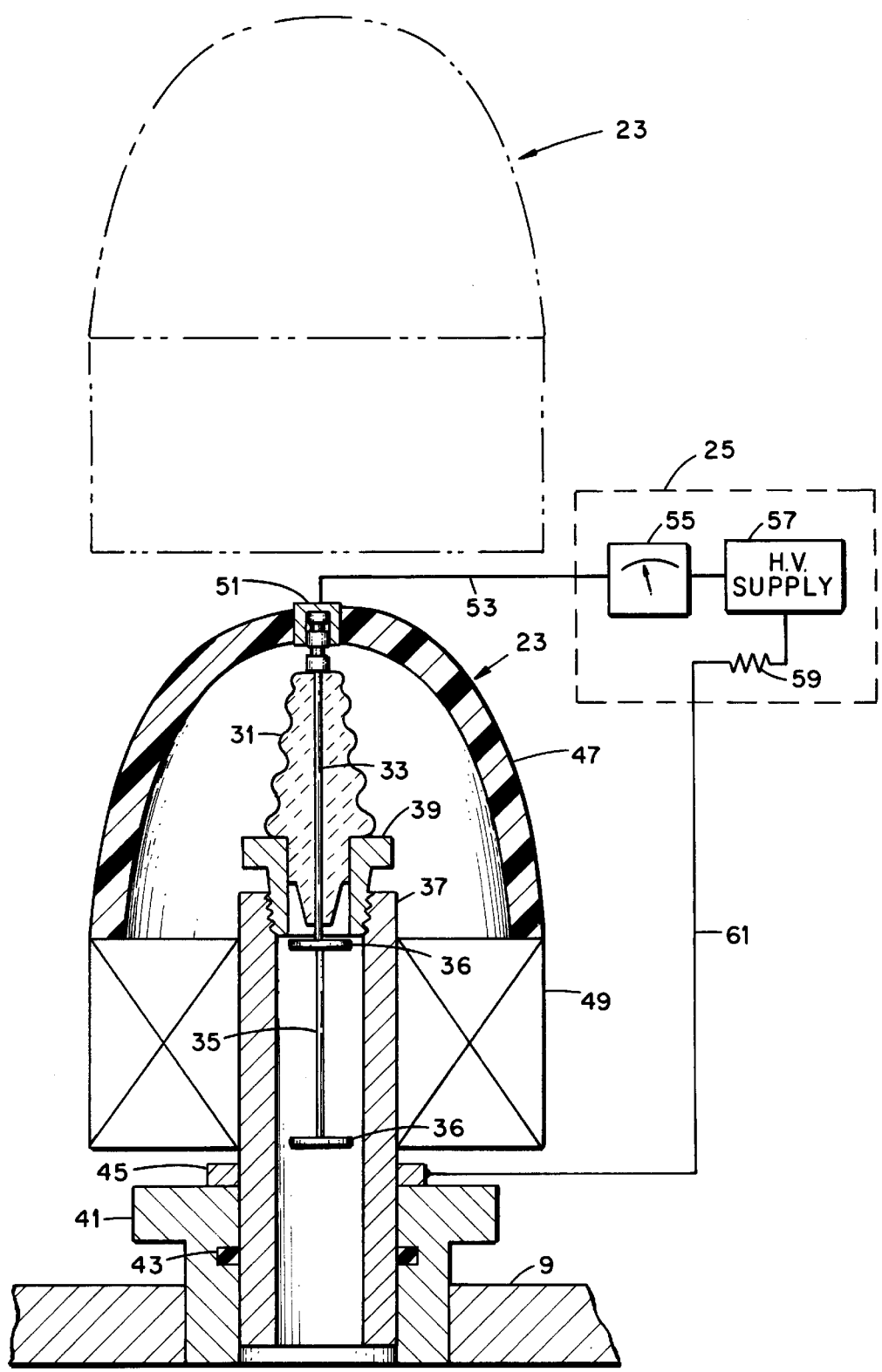
FIG. 2 is a sectional view of a gauge tube as is provided for each of the gas centrifuge vacuum casings, as shown in FIG. 1, with the portable magnet carrier and readout connector means shown both in position for measurement and in phantom to indicate the removable portion.

Referring now to FIG. 2, there is shown a sectional view of the gauge tube assembly 21 and the removable assembly 23 which is also shown in phantom in the removed position. The gauge tube assembly 21 comprises a high voltage (HV) insulating bushing 31 having a center electrode 33. An anode electrode 35 made in the form of a rod of non-magnetic, electrically conductive material is welded or otherwise attached to the inboard end of the electrode 33. The rod 35 may be provided with field forming discs 36, which tend to confine the ion current flow in the area in which the magnetic field is applied. The discs are formed from non-magnetic, electrically conductive material, like the anode. Alternatively, the anode may be formed by a wire hoop which is attached to the electrode 33 and positioned in a plane parallel to the gauge tube axis. A non-magnetic electrically conductive tube 37, such as a brass sleeve to form the cathode electrode, is adapted at one end to accept the bushing 31, such as the sleeve 39 which threadably engages the inner wall of tube 37. It has been found that a conventional automobile spark plug with the ground electrode removed may be used to form the insulated terminal for the anode 35 and yet maintain a gas-tight seal. The tube 37 encloses the anode 35 within an extended portion of the tube from the opposite end which is inserted into a conventional vacuum fitting 41 so that the interior of the tube 37 communicates with the vacuum system, as shown.

The tube 37 may have its outer surface machined, polished or otherwise prepared to ensure that a good seal is obtained at the O-ring 43 in the vacuum fitting 41. A flange 45, which may be brazed to the outer surface of tube 37, provides a stop, preventing the tube from being pulled into the vacuum system. As illustrated in FIG. 1, the vacuum system in this case is a centrifuge casing 9 and the vacuum fitting 41 is welded in an opening in the casing 9.

The portable means, which includes the removable assembly 23 and the power supply and readout unit shown enclosed in dashed lines 25 in FIG. 2, is easily moved about as shown in FIG. 1 to be selectively positioned on a particular centrifuge casing gauge tube 21. The removable assembly 23 consists of a generally bell-shaped electrically insulating housing member 47 which carries a toroidally shaped magnet 49 affixed to the lip of the housing 23. The housing 23 may be formed of various electrically insulating materials, such as hard rubber, plastic, or epoxy molding. Although an electromagnet may be used with the assembly, it is preferred that the permanent magnet be used, thus eliminating the need for additional hardware and circuitry for driving the electromagnet.

The housing 23 is provided with an electrical connector 51 at the crown of the housing 47 which provides a snap-fit onto the terminal 33 of the gauge tube assembly 21. The connector 51 is connected by means of a lead wire 53, to the power supply and readout circuit 25. The power supply and readout circuit may be a conventional circuit for a cold cathode-type vacuum gauge in which an ammeter 55, a high voltage supply (typically 2 to 4 Kv) and a resistor 59 are connected in series. The outboard end of resistor 59 is then connected to ground or preferably connected to the cathode 37 of the gauge tube assembly 21 by means of connector cable 61. The meter 55 may be calibrated directly in torrs which, in the example as illustrated, would read pressure in the range of from $1 \times 10^{-5}$ to $3 \times 10^{-3}$ torr.

In operation, the removable assembly 23 is placed over the gauge tube assembly 21 with the magnet 49 being slipped over the tube 37.

When fully in place, the magnet 49 is automatically aligned with the anode 35 and the high voltage connector 51 is in contact with the electrode 33 of the gauge tube assembly 21. The power supply to the circuit is turned "on" and the current passing between the anode and cathode electrodes may be read directly and converted by means of a calibration chart, or, as pointed out above, the meter 55 may be calibrated directly in desired pressure units.

With the rod shaped anode 35 configuration shown in FIG. 2, the magnet is polarized so the magnetic lines of flux flow in parallel through the center of the toroid and thus parallel to the, rod 35, causing the electrons in the field between the anode 35 and cathode 37 to migrate toward the anode 35 in a spiral motion to obtain increased residence time.

The alternative hoop anode configuration, as suggested above, a common commercial gauge configuration, requires that the magnetic field be at right angles to the plane of the hoop. Therefore, a toroidal shaped magnet must be provided with opposite polarity pole faces at diametrically opposite positions on the inner face of the toroid and polarized accordingly to provide the proper field. In this configuration the magnet must be rotated to obtain this orientation which is recognized by a maximum reading on the meter 55.

This removable assembly eliminates the very precise alignment of the cathode and the magnet that is part of the assembly of a commercially available cold cathode vacuum gauge and adds to the expense of such gauges.

Further, the high voltage bushing 31 of a commercial cold cathode vacuum gauge is an expensive component because it is involved in this careful alignment and must be of special fabrication. In the subject invention, however, the bushing 31 can be a standard ceramic seal or preferably, as pointed out above, an ordinary automobile spark plug with the ground electrode removed.

As pointed out above, the considerable cost savings in the,arrangement whereby the removable assembly may be used to measure pressure on a considerable number of vacuum systems eliminates the need for having an expensive cold cathode-type vacuum gauge mounted with each vacuum system. The portable magnet assembly 23 allows tremendous cost savings. As pointed out above, the magnet may be a permanent magnet or an electromagnet, or even a coil wound without the core. In the case of an electromagnet, the current through the coil would need to be regulated for a constant magentic field in the area between the anode and cathode of the gauge tube assembly 21.

Thus, it will be seen that the subject invention provides a very economical vacuum gauging system for use in measuring pressure in a facility wherein there is a large number of separate vacuum systems, as in a gas centrifuge cascade. In a large-scale gas centrifuge plant, the subject invention would provide a sizeable monetary savings. The price of a single commercially available vacuum cold cathode vacuum gauge for this application is about $150. In the large quantities that would be ordered, prices in the range of $60 to $75 per gauge are thought to be accurate. However, the cost per centrifuge with the system of the present invention would average no more than $15 to $20 per machine, which is a considerable saving in a large gas centrifuge plant. Because of the extreme simplicity throughout, repair and replacement of in-service gauges likewise afford a further cost savings.

Although this invention has been illustrated by way of a specific example as used in a gas centrifuge cascade, it will be obvious to those skilled in the art that various modifications and changes may be made in the system without departing from the spirit and scope of the invention as set forth in the following claims attached to and forming a part of this specification.

What is claimed is:

1. A pressure gauging system based on the cold cathode-type detection for measuring the pressure in a plurality of separate vacuum systems by means of a single portable assembly, comprising:

a plurality of gauge tube assemblies corresponding to the plurality of separate vacuum system separately mounted to communicate with a corresponding one of said plurality of separate vacuum systems, each tube assembly including a non-magnetic electrically conductive tube sealably engaging the housing of the corresponding vacuum system at one end so that the tube interior is in fluid communication with said vacuum system and extends outward from said vacuum system housing, said gauge tube forming a cathode electrode, an electrically insulated anode terminal assembly sealably connected to the opposite end of said gauge tube, a non-magnetic anode electrode disposed within said gauge tube in spaced relation therewith and connected to said anode terminal;

a portable means adapted to removably engage the gauge tube of a selected one of said vacuum systems whose pressure is to be measured for applying a predetermined anode voltage and a magnetic field in the area of said anode and said cathode of the selected system gauge tube assembly and recording the current flow between said cathode and said anode as a measure of the pressure of the selected vacuum system.

2. The pressure gauging system as set forth in claim 1 wherein said anode electrode is in the form of a cylindrical rod disposed centrally, coaxially within said gauge tube.

3. The pressure gauging system as set forth in claim 2 wherein said portable means includes a housing formed of an electrically insulating material and adapted for removable displacement over the extended portion of said gauge tube, a magnet carried by said housing aligned axially along said gauge tube with said anode electrode to provide a magnetic field in the area between said anode and said cathode aligned generally parallel to the axis of said anode, means electrically connected to said anode terminal for supplying a voltage between said anode and said cathode in the range of from 2 to 4 K volts and providing an indication of the pressure within said gauge tube according to the magnitude of said current flow.

4. The pressure gauging system as set forth in claim 3 wherein said magnet is a toroidal-shaped permanent magnet.

5. The pressure gauging system as set forth in claim 4 wherein said plurality of separate vacuum systems is a gas centrifuge cascade.

\* \* \* \* \*